(12) United States Patent
Frank

(10) Patent No.: US 6,285,404 B1
(45) Date of Patent: Sep. 4, 2001

(54) SYSTOLIC VIDEO ENCODING SYSTEM

(75) Inventor: Michael Frank, Newtown, PA (US)

(73) Assignee: ATI Technologies Inc., Thornhill (CA)

( * ) Notice: Subject to any disclaimer, the term of this patent is extended or adjusted under 35 U.S.C. 154(b) by 0 days.

(21) Appl. No.: 09/126,971

(22) Filed: Aug. 3, 1998

(51) Int. Cl.[7] .................................................. H04N 7/01
(52) U.S. Cl. ........................ 348/469; 348/537; 348/575
(58) Field of Search .................................. 348/469, 470, 348/537, 845, 845.2, 910, 441, 446, 572, 573, 575, 453; H04N 7/01

(56) References Cited

U.S. PATENT DOCUMENTS

| 4,996,595 | * | 2/1991 | Naito et al. | 358/150 |
|---|---|---|---|---|
| 5,014,129 | * | 5/1991 | Imanishi | 258/166 |
| 5,359,366 | * | 10/1994 | Ubukata et al. | 348/537 |
| 5,703,654 | * | 12/1997 | Iizuka | 348/446 |
| 5,710,595 | * | 1/1998 | Hang et al. | 348/419 |
| 5,784,120 | * | 7/1998 | Cummins et al. | 348/537 |
| 5,790,110 | * | 8/1998 | Baker et al. | 345/202 |
| 5,905,536 | * | 5/1999 | Morton et al. | 348/441 |
| 5,914,753 | * | 6/1999 | Donovan | 348/441 |
| 5,936,678 | * | 8/1999 | Hirashima | 348/537 |
| 5,959,679 | * | 9/1999 | Kawamura | 348/446 |
| 6,069,663 | * | 5/2000 | Bessel et al. | 348/446 |

* cited by examiner

Primary Examiner—Reinhard J. Eisenzopf
Assistant Examiner—Jean W. Désir
(74) Attorney, Agent, or Firm—Vedder, Price, Kaufman & Kammholz

(57) ABSTRACT

A systolic video encoding system processes image data from a frame buffer at a core clock rate that is independent of the sample rate of the image data. The video encoder of this invention uses the core clock rate of the host image processing system to process image from the frame buffer at this core clock rate. The image data is pumped out of the frame buffer, processed by each of the processes of the video encoder when the data reaches each of the processes, and the encoded samples are stored in a raster sample buffer for subsequent processing. The image data is continually pumped out of the frame buffer at the core clock rate until the raster sample buffer is full. As the samples are extracted from the raster sample buffer, subsequent image data is pumped into the video encoding system, producing a systolic processing effect. By allowing operation at a core clock rate that is independent of, and substantially higher than, the image sample rate, elements of the system can be used in a time-shared manner, thereby reducing the cost and size of the video encoding system.

20 Claims, 5 Drawing Sheets

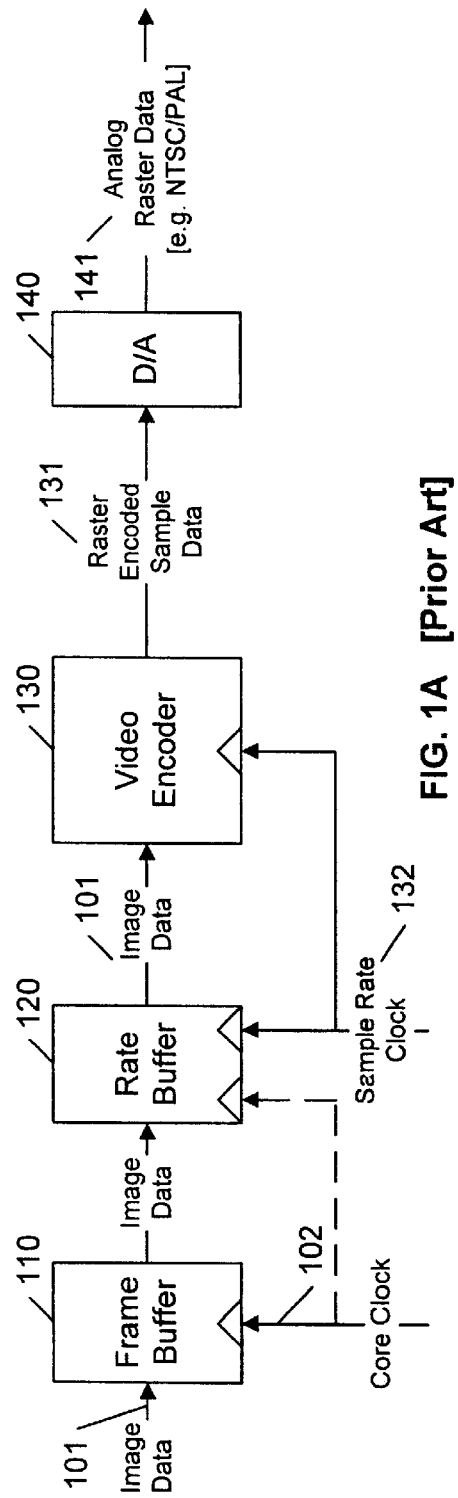
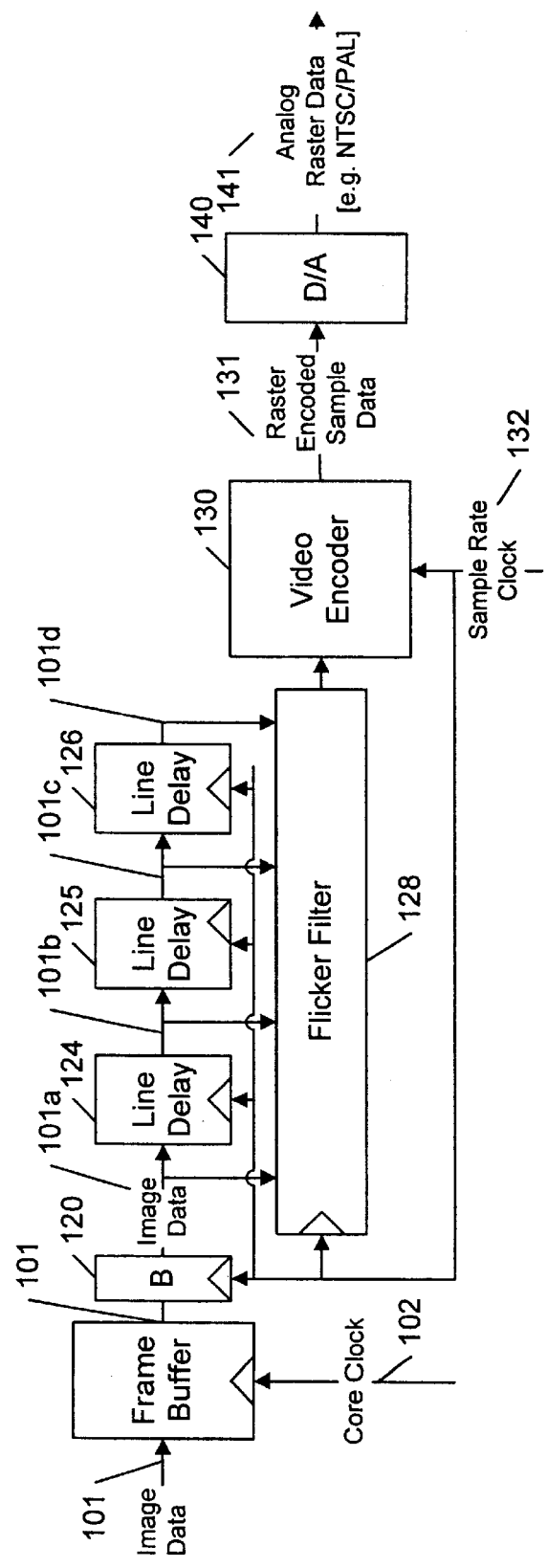
FIG. 1A [Prior Art]
FIG. 1B [Prior Art]

SYSTOLIC VIDEO ENCODING SYSTEM

FIELD OF THE INVENTION

The invention relates generally to graphics image processing and more particularly to the encoding of image data into a television broadcast format.

BACKGROUND OF THE INVENTION

Conventional television receiving systems conform to standards, such as NTSC and PAL, that have evolved since the initiation of television broadcasting. Because these standards evolved over time, these standards include, for example, modulation schemes that allow for the transmission of color images without adversely affecting the reception and reproduction of these images on televisions that are only capable of displaying images in black and white. These standards also include rasterization schemes, such as interlaced scanning, that optimize transmission bandwidth by taking advantage of the filtering effect of the human visual system.

Computer graphics systems, on the other hand, evolved long after the technology for high quality image reproduction had become available. Because of the demand for high quality and high resolution, for example, conventional computer monitors do not use the aforementioned interlaced scanning of conventional television, and can provide well over a thousand lines of resolution, compared to a convention television's 525 lines of resolution.

The delineation between video image processing, such as television, and graphics image processing, such as computer imaging, is becoming blurred. Devices are available for "set-top" use, for displaying images and text from the world-wide web on conventional televisions, and computer boards are available for displaying broadcast television within a window of a computer screen.

Standards, such as SMPTE 125 and CCIR 601, have been developed for the digital production, storage, and display of images that are substantially compatible with the display of images using NTSC and PAL rasterizing techniques, albeit at higher resolution. These standards address the number of lines per screen image (vertical resolution), the number of digital samples per line (horizontal resolution), and the number of bits per digital sample. The encodings provided by these standards are baseband encodings, and do not include, for example, the modulations that are applied for conventional NTSC or PAL raster encodings. To communicate a digital encoding of image data to a conventional television receiver, the image data must be modulated to conform to the conventional television broadcast conventions, as defined for example by the FCC. That is, for example, the FCC has allocated a maximum of 6 MHz for a television channel transmission; the color information, or chrominance, is quadrature-phase modulated about a chrominance subcarrier frequency at 4.829545 MHz; the audio information is frequency modulated about a sound center frequency at 5.75 MHz; and so on.

FIGS. 1A and 1B illustrate the use of a conventional video encoder to effect the modulation of digitally encoded image data to form raster data for communication to a conventional television. Because this invention particularly addresses the processing of video information, the figures herein are limited to the processing of image data. The myriad of other tasks performed to transmit a composite television signal, common in the art of television broadcasting, are excluded from the figures, for ease of understanding.

FIG. 1A illustrates a frame buffer 110 that is used to store and retrieve image data 101. The frame buffer 110 is conventionally a component of an image processing system (not shown) that creates the digitally encoded image data 101. The image processing system may be, for example: a computer graphics system that is used to create images; a computer system that receives images from other sources, such as the world-wide web; a digital video disc player; and the like. The image processing system typically operates at a substantially higher clock rate than conventional video systems, such as televisions; this higher clock rate is termed herein as the core clock rate, and is illustrated in FIG. 1A by the core clock signal 102. For efficient processing, the frame buffer 110 is conventionally implemented in dynamic RAM, and is designed to operate at the core clock rate. In high performance graphics processing systems, the core clock rate is over 100 MHz, and can be expected to increase as new technologies become available. The aforementioned digital image standard, CCIR 601, specifies an interface clock rate of 27 MHz for the communication of image data, corresponding to the sample rate of the image data, which consists of a luminance component at 13.5 MHz, and two chrominance components at 6.25 MHz each. In a conventional system, a rate buffer 120 is used to provide the samples from the high speed frame buffer 110 at the appropriate sample rate, in response to the sample rate clock 132. These samples are encoded for transmission using conventional television broadcast encoding techniques, common in the art. Because the image data 101 corresponds to luminance and chrominance samples at submultiples of the sample rate, and the image data 101 is extracted from the rate buffer 120 at the sample rate, the conventional video encoder 130 is typically structured to operate in a pipeline manner at the sample rate. The video encoder produces raster encoded sample data that is converted into analog form by a digital to analog converter 130.

If each high resolution line of a CCIR 601 encoded image is displayed on a conventional interlaced NTSC receiver, the additional details will produce a visually apparent flicker effect. FIG. 1B illustrates the use of a flicker filter 128 that eliminates these additional details by forming each line of image data that is provided to the video encoder 130 as a weighted average of three or four lines of the high resolution image data. The data elements corresponding to vertically adjacent image samples are separated in the frame buffer by the number of data elements per line. The extraction of data from the frame buffer 110 at a rate that is asynchronous to core clock rate incurs a substantial performance penalty. Therefore, the direct extraction of each data element corresponding to each of the three or four lines is not feasible. As illustrated in FIG. 1B, line delays 124, 125, and 126 are used to obtain each vertically adjacent data element in the high resolution image data 101. The image data 101 is extracted from the frame buffer 110 by the rate buffer 120 at the sample rate. Each sample of the image data is clocked through each of the line delays 124, 125, and 126, such that the sample appears at the output of the line delay after a number of sample rate clock cycles corresponding to the number of samples per line of image data. In this manner, the sample of the image data at 101d corresponds to a location on the image that is vertically above the location of the sample of the image data at 101c, which is vertically above the location of the sample at 101b, which is vertically above the location of the sample at 101a. The flicker filter 128 receives each sample at 101d, 101c, 101b, and 101a, and provides a weighted average of these samples to the video encoder 130 at each sample rate clock cycle. Because each line delay must be sufficiently sized to contain a full line of image data, the use of multiple line delays to effect flicker filtering can be cost or area prohibitive.

As is common in the art, cost and area efficiencies can be realized by time-sharing devices, and by allocating the available time on an as-needed basis. In time-sharing, if two identical devices each perform an operation that consumes half the available time, one of these devices may be eliminated if the two operations can be performed sequentially. In as-needed time allocation, the system is designed to provide an overall throughput rate, but individual processes may have varying performance times, depending on the particular task being performed at that time. A pipeline system, however, introduces substantial constraints on the use of time-sharing and time-allocation. A pipeline system halts if any process in the pipeline is not completed when the next clock cycle occurs; therefore, each of the processes and subprocesses, such as timeshared processes, must be synchronized to the clock to assure completion. Because the rate buffer, the video encoder, and the flicker filter, if any, are operated in a pipeline fashion, the performance of the video encoding system is limited to the speed of the slowest process in the pipeline, and limited to the rate of the sample rate clock 132.

Consequently, there exists a need for a video encoding device that operates independent of the sample rate clock, thereby providing area and cost efficiencies that are not constrained by external factors, such as sample clock rates. A need also exists for a video encoding device that can efficiently perform flicker filtering without the need for multiple line delay buffers.

BRIEF DESCRIPTION OF THE DRAWING

FIGS. 1A and 1B illustrate example block diagrams of prior art video encoding systems.

DETAILED DESCRIPTION OF A PREFERRED EMBODIMENT OF THE INVENTION

The disclosed invention is a video encoding system that processes image data at a core clock rate that is independent of the sample rate of the image data. The video encoder of this invention uses the core clock rate of the host image processing system to process images from the frame buffer at this core clock rate. The image data is, symbolically, pumped out of the frame buffer, processed by each of the processes of the video encoder when the data reaches each of the processes, and the encoded samples are stored in a raster sample buffer for subsequent processing. The image data is continually pumped out of the frame buffer at the core clock rate until the raster sample buffer is full and this full state propagates back to the frame buffer. As the samples are extracted from the raster sample buffer, subsequent image data is pumped into the video encoding system, producing a systolic processing effect. By allowing operation at a core clock rate that is independent of, and substantially higher than, the image sample rate, processes such as flicker filtering and chrominance data modulation can be effected with a minimal number of processing components, thereby reducing the cost and size of the video encoding system.

Figure 2:
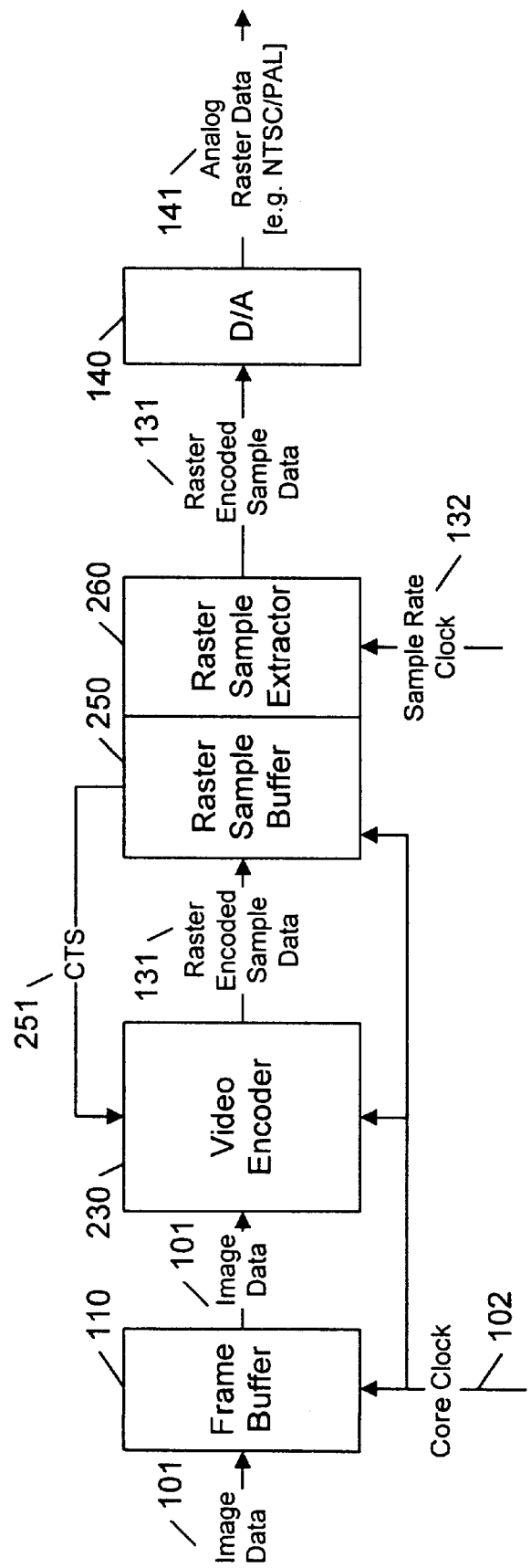
FIG. 2 illustrates an example block diagram of a video encoding system in accordance with this invention.

FIG. 2 illustrates an example block diagram of a video encoding system in accordance with this invention. A frame buffer 110 provides image data 101 to a video encoder 230 that produces and stores raster encoded sample data 131 into a raster sample buffer 250. The image data 101 comprise samples of the value of an image at locations in the image corresponding to a given sample rate. For example, the image data 101 may comprise the luminance and chrominance values associated with the image at a specified number of points on each of a specified number of lines that form the image. The video encoder 230 processes the image data 101 at a core clock rate. In a preferred embodiment, the core clock rate is the clock rate at which the frame buffer 110 operates efficiently in an image processing system. In this manner, the extraction of the image data 101 from the frame buffer 110 can be effected with minimal overhead, and minimal impact on the image processing system (not shown) that provides the image data 101 to the frame buffer 110. The video encoder 230 processes the image data 101 from the frame buffer 110 until the raster sample buffer is full. The raster sample buffer 250 asserts a ready to send RTS 251 signal whenever space is available in the raster sample buffer 250 for receiving raster encoded sample data 131 from the video encoder 230. In a preferred embodiment, the RTS 251 signal is provided to the process in the video encoder that provides the raster encoded sample data 131 to the raster sample buffer 250; if that process can accept additional data from its preceding processes while waiting for the RTS 251 signal to be reasserted by the raster sample buffer 250, it continues to do so. In this manner, processes are halted only when they cannot propagate their data, rather than being halted whenever any process in a pipeline cannot propagate its data. That is, by being independent of the image data sample rate, each process within the video encoder 230 can be optimized to perform its task as quickly or as efficiently as possible, without regard to the sample rate that is associated with the data being processed.

The raster sample extractor 260 extracts the raster encoded data sample data 131 from the raster sample buffer 250 at the image data sample rate. The extracted raster encoded sample data 131 is provided, for example, to a digital to analog converter 140 to form analog raster data 141, suitable for transmission to a conventional raster television (not shown).

Figure 3:
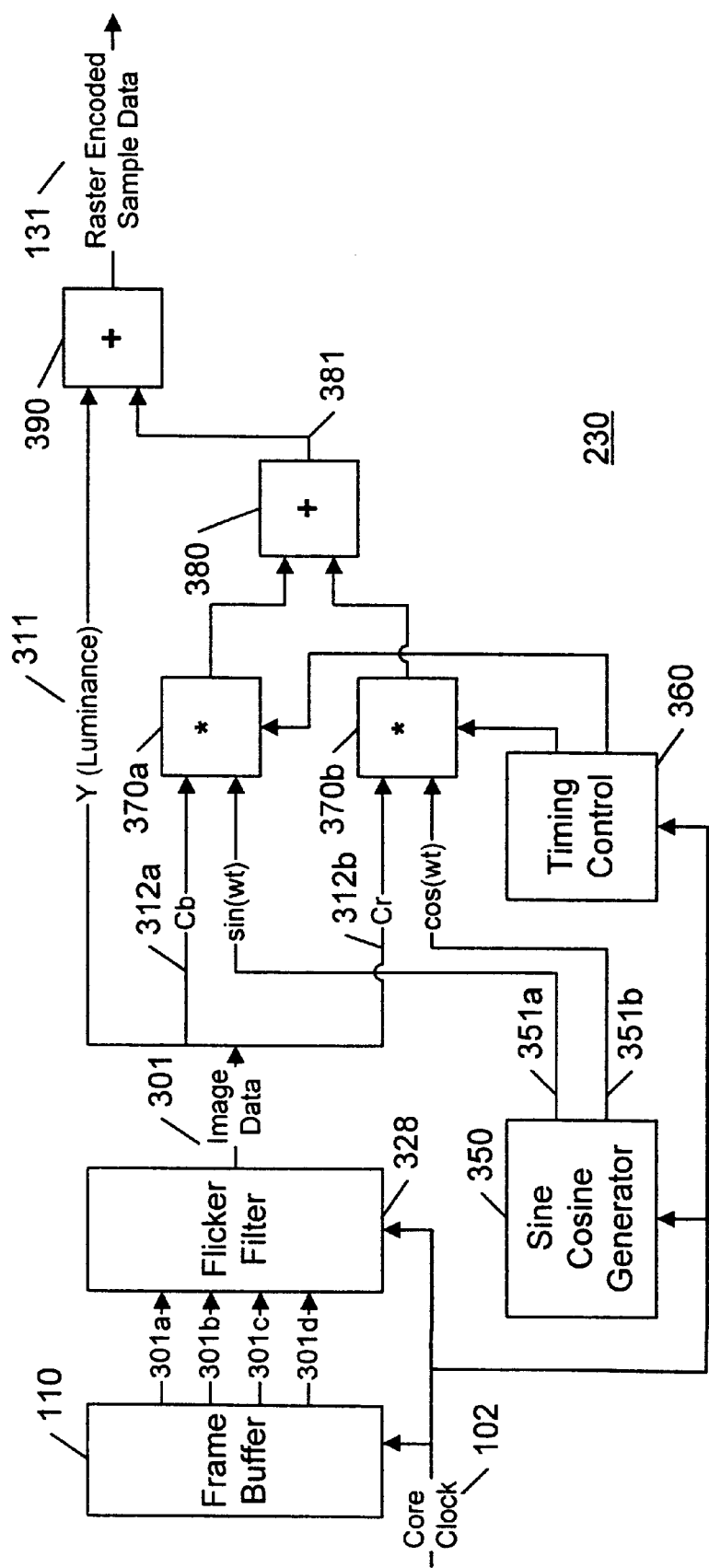
FIG. 3 illustrates an example block diagram of a video encoder in accordance with this invention.

FIG. 3 illustrates an example block diagram of a video encoder in accordance with this invention. As previously mentioned, for clarity, the figures herein exclude those elements of a video encoder that are common in the art and not directly related to the encoding of image data into raster formatted data. FIG. 3 illustrates the encoding of high resolution image data 301*a–d* that is contained in the frame buffer 110 into raster encoded sample data 131. The raster encoded sample data 131 conforms to the conventional standards of raster data; for example, in an NTSC system, the raster encoded sample data 131 is a sampled representation of the combination of baseband luminance information and chrominance information that is modulated about a subcarrier frequency of 3.58 MHz. Because the video encoder 230 operates at the same core clock frequency as the frame buffer 110, multiple streams 301*a–d* of image data can be accessed from the frame buffer 110 with minimal impact on the image processing system (not shown) that provides the image data 101 to the frame buffer 110. The multiple streams 301*a–d* of image data correspond to the image data at vertically adjacent locations in the image, and correspond to the previously discussed image data 101*a–d* of FIG. 1B. The flicker filter 328 corresponds to the flicker filter 128, except that the flicker filter 328 processes the image data 301*a–d* at the core clock rate. The flicker filter 328 produces smoothed image data 301 that is the weighted average of the image data 301*a–d* corresponding to multiple high resolution vertically adjacent lines of image data 101 in the frame buffer 110. Image data 101, 101*a–d,* 301, and 301*a–d* in the examples provided consists of three components: a luminance component and two chrominance components. Other formats of image data may also be utilized, and conversion processes to and from such forms, such as RGB and others, are common in the art. The chrominance components 312*a,* 312*b* of the image data 301 are quadrature-phase modulated about a subcarrier by the multipliers 370*a* and 370*b*. Multiplying each chrominance component 312*a,* 312*b* by the sine 351*a* and cosine 351*b* factors, respectively, of the subcarrier signal effects the quadrature-phase modulation. A sine cosine generator 350 generates the sine 351*a* and cosine 351*b* factors.

A timing control 360, operating at the core clock frequency, synchronizes the generation of the sine 351*a* and cosine 351*b* factors corresponding to the phase of the subcarrier signal relative to the image data sample rate. That is, although the video encoder 230 is operating at a core clock rate that is independent of the image data sample rate and the subcarrier signal frequency, the timing control 360 effects the mathematical equivalent of the modulation of the image data with the subcarrier signal at their respective frequencies. By knowing the defined image data sample rate, a time can be associated with the occurrence of each data sample, and the value of the sine and cosine function of a continuous sinusoidal subcarrier signal can be mathematically determined at each of the times of occurrences of each data sample. An example of the control and generation of sine and cosine factors corresponding to a subcarrier signal relative to an image sample rate is presented in FIG. 4.

The adder 380 sums the modulated products of multipliers 370*a* and 370*b* to form the quadrature phase modulated chrominance signal 381. The adder 390 sums the luminance component 311 of the image data 301 with the quadrature phase modulated chrominance signal 381 to produce the raster encoded sample data 131. That is, the raster encoded sample data 131 is the mathematical equivalent of a conventional luminance plus modulated chrominance raster signal that is sampled at the image data sample rate.

Figure 4:
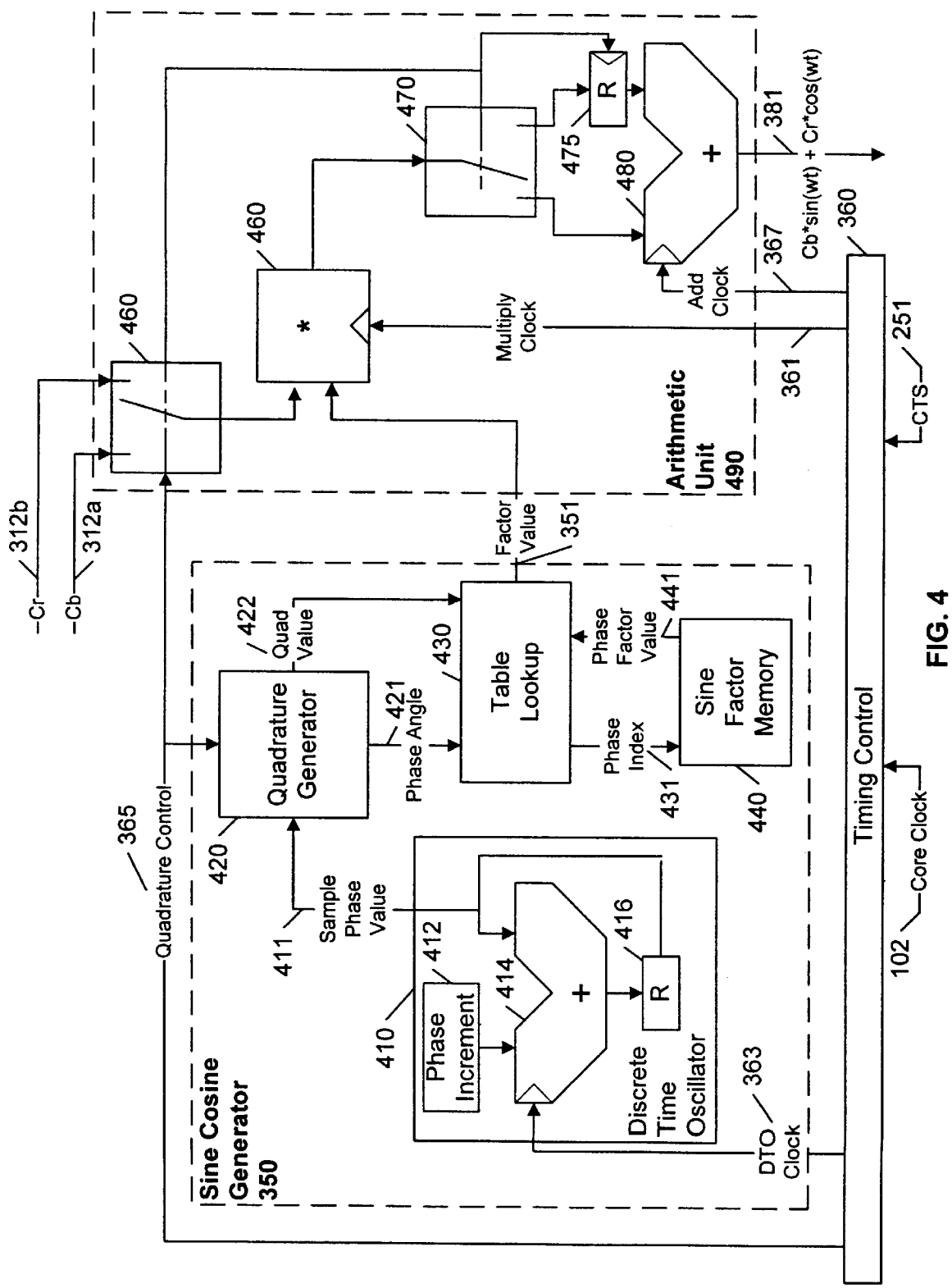
FIG. 4 illustrates an example block diagram of a video encoder with time-shared components in accordance with this invention.

By operating the video encoder 230 at a core clock frequency that is independent of the image data sample rate, while providing the mathematical equivalent of operation at the image data sample rate, optimizations can be effected without the constraints imposed by the image data sample rate. FIG. 4 illustrates an example block diagram of a video encoder with time-shared components in accordance with this invention, and FIG. 5 illustrates a timing diagram corresponding to this example time-sharing of components.

Illustrated in FIG. 4 is a block diagram of an example sine cosine generator 350 and an arithmetic unit 490. The sine cosine generator 350 generates sine and cosine factor values 351 corresponding to the phase of a subcarrier signal relative to the image data sample rate. The example sine cosine generator 350 includes a discrete time oscillator DTO 410, a quadrature generator 420, a table lookup 430, and a sine factor memory 440. The timing control 360 provides a DTO clock 363 that effects the generation of a phase value 411 of the subcarrier signal that corresponds to the time of each occurrence of each image data sample. Note that neither the subcarrier signal, nor an image data sample clock are physically present in the embodiment illustrated in FIG. 4. The DTO 410 emulates the presence of a subcarrier signal that has a changing phase value relative to the occurrence of a sample clock by incrementing a register 416 by a phase increment 412 at each occurrence of the DTO clock 363. Consider, for example, an image data sample rate of 13.5 MHz, and a subcarrier frequency of 3.58 MHz. Each data sample corresponds to samples taken at a 0.074074 microsecond (1/13.5 MHz) interval. In 0.074074 microseconds, the phase of a 3.58 MHz signal will advance by 1.665 radians (3.58 MHz *2π*0.074074 microseconds). Equivalently, the phase of the 3.58 MHz signal will advance by 0.265 cycles (3.58/13.5) at each occurrence of a data sample at 13.5 MHz. Therefore, in this example, if the DTO clock 363 corresponds to each image data sample 301, and the phase increment 412 contains a value that corresponds to 0.265 cycles, the contents of the register 416 will correspond to the phase value of a 3.58 MHz subcarrier signal at each occurrence of each data sample 301. By providing a phase increment 412 that is related to a full cycle, the integer value of the sum from the adder 414 is the number of cycles, and the fractional value is the phase angle within the current cycle. The register 416 is configured to contain the fractional value only, thereby providing an ongoing measure of the phase angle, independent of the cycle number. The integer value of the sum from the adder 414 is ignored in this embodiment.

Note that although the DTO clock 363 corresponds to each image data sample 301, and each image data sample 301 corresponds to a 13.5 MHz sampling of the image, the frequency of the DTO clock 363 is independent of the 13.5 MHz sampling rate. As illustrated in line 5B of FIG. 5, in the example embodiment of FIG. 4, the DTO clock 363 is operated at half the core clock frequency, which is preferably the rate at which the frame memory 110 operates most efficiently, and is independent of the image data sampling rate.

Figure 5:
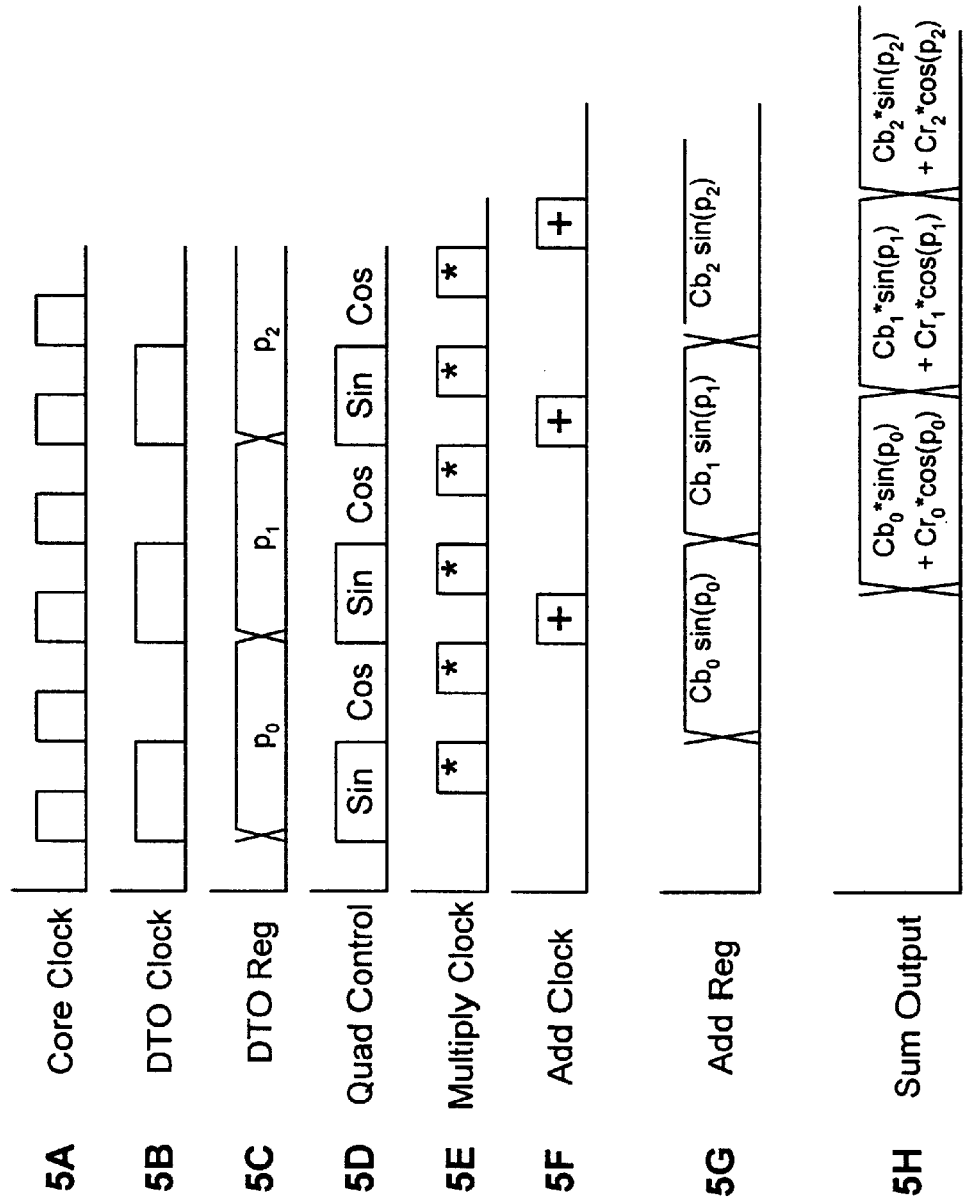
FIG. 5 illustrates an example timing diagram for time-sharing components of a video encoder in accordance with this invention.

The contents of the register 416, corresponding to the phase angle of a subcarrier signal at each occurrence of a sample of the image data 301, is provided as the sample phase value 411 to the quadrature generator 420, and is illustrated on line 5C of FIG. 5. In a preferred embodiment, for efficiency, the table lookup 430 and sine factor memory 440 are configured to provide the sine of an angle. For storage size efficiency, the sine factor memory 430 contains the value of the sine function for phase angles between 0 and 90 degrees. The sample phase value 411 ranges from 0 to 360 degrees. The quadrature generator 420 transforms the actual sample phase value 411 (or the actual phase value 411 plus 90 degrees) to a phase angle between 0 and 90 degrees and a quadrature value that identifies which quadrant the phase angle is associated. For example, if quadrature 0 includes angles between 0 and 90 degrees, and quadrature 1 includes angles between 90 degrees and 180 degrees, the quadrature generator 420 transforms a sample phase value 411 of 98 degrees to a phase angle 421 of 82 degrees (180–98) and a quadrature value 422 of 1. The table lookup 430 transforms the phase angle 421 into a phase index value 431 that indexes the sine factor memory 440 for the phase factor value 442 corresponding to the sine of the phase angle. In the example above, of a sample phase value of 98 degrees, the table lookup 430 obtains the phase factor value 441 that is the sine of 82 degrees (180–98). Because the sine of an angle in quadrant 1 is equal to the sine of 180 degrees minus the angle, the table lookup provides the phase factor value 441 as the factor value 351. In another example, if quadrature 2 includes the angles between 180 degrees and 270 degrees, and the sample phase value 411 is 188 degrees, the quadrature generator provides a phase value 421 of 8 degrees (188–180) and a quadrature value 422 of 2. The table lookup 430 provides a phase index 431 corresponding to a phase angle of 8 degrees to the sine factor memory 440, which thereby provides the phase factor value 441 corresponding to the sine of 8 degrees. Because the sine of an angle in quadrant 2 is equal to the negative of the sine of the angle less 180 degrees, the table lookup provides the negative of the phase factor value 441 as the factor value 351. Angles in quadrant 3, between 270 and 360 degrees, are similarly processed by providing a phase angle 421 of 360 degrees minus the angle to the table lookup 430, which negates the corresponding phase factor value 441 to provide the factor value 351.

Because the video encoder 230 operates at the core clock rate, which is substantially higher than the image data sample rate at which the raster encoder sample data is to be provided, the video encoder 230 is able to perform the processing of each chrominance component 312a, 312b, and each sine 351a and cosine 351b factor of FIG. 3 sequentially in time. The timing control 360 provides a quadrature control signal 365 that controls this sequential processing, illustrated on line 5D of FIG. 5. When the quadrature control signal 365 is asserted to signal the processing of the sine factor, the quadrature generator 420 operates as described above; when the quadrature control signal 365 is de-asserted to signal the processing of the cosine factor, the quadrature generator 420 adds a 90 degree phase shift to the sample phase value 411 before the above processing is effected. The quadrature control signal 365 also controls a switch that selects each of the chrominance components 312a and 312b in sequence.

When the quadrature control signal 365 is asserted, the chrominance component Cb 312a is selected, and the factor value 351 corresponds to the sine of the sample phase value 411. After these values 312a, 351 are provided to the multiplier 330, the timing control 360 asserts the multiply clock 361, as illustrated on line 5E of FIG. 5, and initiates the multiplication of chrominance component Cb 312a with the factor value 351. The asserted quadrature control signal 365 also controls a switch 470 that routes the product from the multiplier 370 to a register 475 that forms one input to an adder 380. The contents of register 475 are illustrated on line 5G of FIG. 5.

When the quadrature control signal 365 is deasserted, the chrominance component Cr 312b is selected and provided to the multiplier 330, and the factor value 351 that is also provided to the multiplier 330 corresponds to the cosine of the sample phase value 411, as discussed above. After these values are provided to the multiplier 330, the timing control 360 asserts the multiply clock 361, and initiates the multiplication of chrominance component Cr 312b with the factor value 351. The switch 470, in response to the deasserted quadrature control signal 365 routes the product from the multiplier 370 to other input of the adder 380. Subsequently, the timing control 360 asserts an add clock 367 to initiate the addition at adder 380, as illustrated on line 5F of FIG. 5. The output 381 of the adder 380 is the sum of the products of each chrominance component Cb 312a and Cr 312b with the corresponding sine and cosine factors 351. That is, the output 381 is the mathematical equivalent of samples of a quadrature phase modulation of the chrominance components Cb 312a and Cr 312b.

Thus it is shown that by operating the video encoder at a core clock rate that is independent of the image data sample rate, area and cost efficiencies can be achieved, such as the implementation of multipliers 370a and 370b as a single multiplier 370, and the use of a single sine factor memory 440 and table lookup 430 to implement the sine cosine generator 350.

It should be understood that the implementation of other variations and modifications of the invention in its various aspects will be apparent to those of ordinary skill in the art, and that the invention is not limited by the specific embodiments described. For example, the flicker filter 328 may also include other functions, such as scaling, anti-aliasing, and the like. The sine cosine generator 350 is presented herein using a table lookup approach, whereas algorithmic functions could be employed as well, or a combination of a relative small table lookup followed by an algorithmic interpolation for additional precision. The video encoder may be implemented in hardware, software, or a combination of both. For example, the video encoder 230 may be implemented as a set of instructions that control a digital signal processor. It is therefore contemplated to cover by the present invention, any and all modifications, variations, or equivalents that fall within the spirit and scope of the basic underlying principles disclosed and claimed herein.

What is claimed is:

1. A video encoding system comprising:

a frame buffer system that provides image data at a core clock rate, a video encoder, operably coupled to the frame buffer system, that processes the image data from the frame buffer system at the core clock rate, to form raster encoded sample data corresponding to a sampling rate that is independent of the core clock rate, and a raster sample buffer, operably coupled to the video encoder, for storing the raster encoded sample data.

2. The video encoding system of claim 1, also including:

a raster sample extractor operably coupled to the raster sample buffer, that removes the raster encoded sample data at an extraction rate that corresponds to the sampling rate.

3. The video encoding system of claim 1, wherein the image data includes at least a first and a second chrominance component, and the video encoder includes:

a multiplier that multiplies the first chrominance component by a first factor to produce a first product, and multiplies the second chrominance component by a second factor to form a second product, and a first accumulator that adds the first product to the second product to form a first sum upon which the raster encoded sample data is based.

4. The video encoding system of claim 3, wherein the multiplier multiplies the first chrominance component by the first factor during a first period of the core clock signal, and multiplies the second chrominance component by the second factor during a second period of the core clock signal.

5. The video encoding system of claim 4, wherein the video encoder also includes:

a discrete time oscillator that generates a sample phase value corresponding to the first period and the second period, a quadrature generator that generates a first quadrature value corresponding to the first period and a second quadrature value corresponding to the second period, a factor memory that contains a plurality of factor values, and a table lookup device, operably coupled to the quadrature generator, that:
selects a phase factor value of the plurality of factor values based on the sample phase value,
determines the first factor based on the first quadrature value and the phase factor value, and determines the second factor based on the second quadrature value and the phase factor value.

6. The video encoding system of claim 3, wherein the image data also includes a luminance component, and the video encoder further includes:
a second accumulator that determines the raster encoded sample data based on the luminance component and the first sum.

7. The video encoding system of claim 1, further including a digital to analog converter that converts the raster encoded data into an analog video encoded signal.

8. The video encoding system of claim 1, further including a flicker filter, operably coupled to the frame buffer, that filters a plurality of pixel samples that are contained in the frame buffer to thereby provide the image data at the core clock rate.

9. The video encoding system of claim 1, wherein the raster encoded sample data includes a plurality of samples, and each sample of the plurality of samples is a luminance value plus a modulated chrominance value corresponding to a modulation rate that is independent of the core clock rate.

10. The video encoding system of claim 1, wherein:
the raster encoded sample data includes a plurality of samples,
the raster sample buffer includes a plurality of storage locations, and the raster sample buffer asserts a clear signal whenever at least one of the plurality of storage locations is available to receive at least one of the plurality of samples of the raster encoded sample data from the video encoder, and
the video encoder processes the image data in dependence upon the clear signal.

11. A video encoder for encoding image data, the video encoder comprising:
a timing control that receives a core clock signal and produces therefrom a quadrature control signal and a discrete time oscillator control signal,
a discrete time oscillator, operably coupled to the timing control, that produces a sample phase value in response to the discrete time oscillator control signal,
a quadrature generator, operably coupled to the discrete time oscillator and the timing control, that produces a phase value and a quadrature value in dependence upon the sample phase value and the quadrature control signal,
a factor memory that provides a phase factor value corresponding to a phase index,
a table lookup, operably coupled to the quadrature generator and the factor memory, that produces the phase index in dependence upon the phase value and the quadrature value, and provides a factor value in dependence upon the phase factor value and the quadrature value, and
an arithmetic unit, operably coupled to the table lookup, that provides raster encoded sample data corresponding to the image data by modulating at least one component of the image data by the factor value.

12. The video encoder of claim 11, wherein:
the quadrature control signal includes a first period and a second period,
the table lookup provides a first factor value during the first period and a second factor value during the second period, and
the arithmetic unit includes:
a switch that selects a first chrominance component of the image data during the first phase and a second chrominance component of the image data during the second stage,
a multiplier that multiplies the first factor value by the first chrominance component during the first period to form a first product, and multiplies the second factor value by the first chrominance component during the second period to form a second product, and
an adder that adds a luminance component of the image data, the first product, and the second product to provide the raster encoded sample data.

13. The video encoder of claim 11, further including a raster sample buffer for storing the raster encoded sample data.

14. The video encoder of claim 13, wherein
the raster encoded sample data includes a plurality of samples,
the raster sample buffer includes a plurality of storage locations, and the raster sample buffer asserts a clear signal whenever at least one of the plurality of storage locations is available to receive at least one of the samples of the raster encoded sample data from the video encoder, and
the timing control produces the discrete time oscillator control signal in dependence upon the clear signal.

15. A method for encoding image data comprising the steps of:
providing image data from a frame buffer system at a core clock rate,
processing the image data from the frame buffer system at the core clock rate to form raster encoded sample data corresponding to a sampling rate that is independent of the core clock rate, and
storing the raster encoded sample data.

16. The method of claim 15, also including the step of extracting the raster encoded sample data at an extraction rate that corresponds to the sampling rate.

17. The method of claim 15, wherein the image data includes at least a first and a second chrominance component, and the step of processing the image data includes:
multiplying the first chrominance component by a first factor to produce a first product,
multiplying the second chrominance component by a second factor to form a second product, and
adding the first product to the second product to form a first sum upon which the raster encoded sample data is based.

18. The method of claim 17, wherein the step of multiplying the first chrominance component by the first factor occurs during a first period of the core clock signal, and the step of multiplying the second chrominance component by the second factor occurs during a second period of the core clock signal.

19. The method of claim 17, wherein the image data also includes a luminance component, and the step of processing the image data further includes adding the luminance component to the first sum to produce the raster encoded sample data.

20. The method of claim 15, further including the step of converting the raster encoded data into an analog video encoded signal.

* * * * *